Jan. 20, 1959    D. W. GARBELLANO    2,869,133
UNDERWATER HOOD
Filed June 1, 1956
FIG_1_
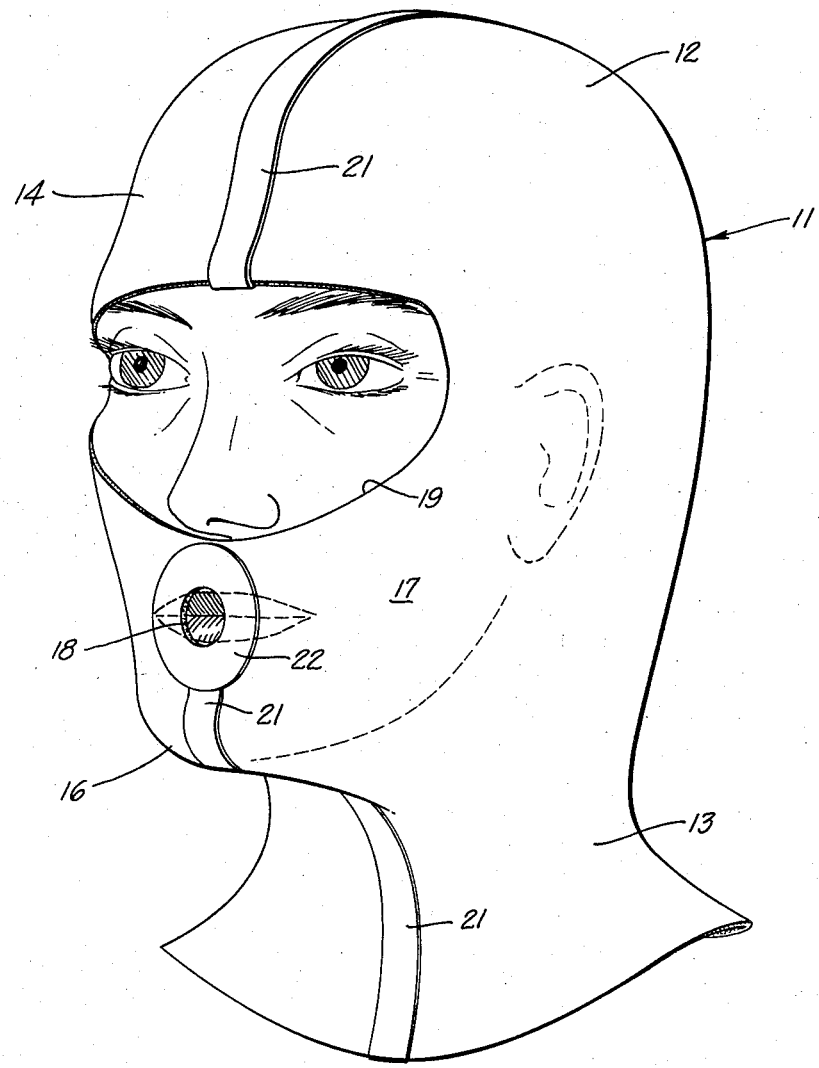
FIG_2_
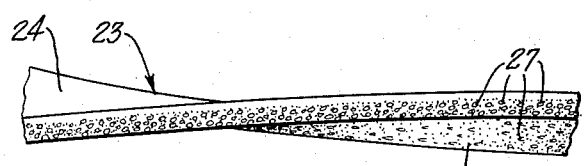
INVENTOR.
David W. Garbellano
BY
William D. Hager
ATTORNEY.

United States Patent Office 2,869,133
Patented Jan. 20, 1959

2,869,133

UNDERWATER HOOD

David W. Garbellano, Berkeley, Calif.

Application June 1, 1956, Serial No. 588,843

7 Claims. (Cl. 2—68)

This invention relates to rubber hoods suitable for underwater wear. In particular, it relates to an integral head and neck covering garment manufactured from unicellular "Neoprene" foam rubber providing a smooth, durable outer surface or "skin" in association with an inner texture of discretely porous unicells affording warmth and close adhesion to tis wearer resulting from inherent resilience and vacuum-induced bonding.

This application is a continuation-in-part of copending application Serial No. 405,597, filed January 22, 1954, now Patent No. 2,749,551, granted June 12, 1956, to David W. Garbellano.

In order for an underwater hood to be efficient and satisfactory for continuing use, it must meet certain desirable requirements. It should afford proper means for keeping its wearer warm and protecting him against painful abrasions and other injuries occasioned by contact with corals, shells and other sharp or jagged obstructions such as rocks and sunken debris. It should be comfortable, permitting effortless movement, and it should be durable and easy to care for. It should be easily donned and doffed, should have little or no extraneous gear attached thereto, and should be sufficiently streamlined to provide ease and speed in moving through the water. It is also described that the material out of which the hood is fabricated to be such nature as to increase the buoyancy of its wearer without promoting excessive change in such buoyancy with change in immersion depth. Other important features of advantage will be apparent from a consideration of the invention as set forth herein.

Various materials of construction have been recommended for possible use in the manufacture of underwater garments, including head and neck protecting devices. Hoods made from thin, non-porous rubber, from leather and the like, or those fabricated from cotton, wool or other cloth are unsatisfactory in most instances. Thin, relatively non-elastic materials are awkward, baggy and loose-fitting. They afford little or no protection against cold water and introduce additional problems of instability and excessive buoyancy.

The application of conventional "Neoprene" foam rubber to the problem has been suggested, and underwater hoods made from this material are now commercially available. However, the drawbacks of conventional "Neoprene" will be readily recognized from a later consideration thereof. Neoprene is a trade name signifying the synthetic rubber made by the controlled polymerization of chloroprene, a material produced by the addition of hydrochloric acid to vinlyacetylene. The term "Neoprene" is so widely used today that its meaning has become almost synonymous with synthetic rubber. Conventional neoprene foam rubber is generally made in sheets of various thicknesses, having relatively smooth top and bottom surfaces resulting from their having direct contact with forms or platens during manufacture. While still viscous, the synthetic elastomer is poured over a first platen and then a second platen is positioned in close relationship with said first platen, the distance therebetween usually being the same throughout the sheet and predetermined by the thickness of product desired. The foamy, unicellular quality of the internal mass of the neoprene sheet is produced, at least in part, by including in the viscous synthetic elastomer a smaller amount of a selected gas-generating chemical which causes an indeterminate number of minute bubbles or foamy discrete particles to form throughout the internal mass, while leaving the smooth surface of "skin" undisturbed.

This material, designated herein as conventional neoprene foam rubber, has certain definite advantages over the relatively inelastic, thin rubber mentioned heretofore. Foam rubber, with its unicellular structure, increases the buoyancy of the wearer because of its multitudious pockets of entrapped gases. These entrapped gases, having low heat conductivity, also serve the most useful purpose of insulating the wearer's body from cold temperatures often encountered in underwater swimming and diving. This is of especial importance with regard to the wearer's head or neck since these portions of the body are most susceptible to cold as the blood circulation does not take place there to so pronounced a degree as in the arms, legs and more mobile parts of the body. Moreover, this unicellular structure maintains body-warmth by preventing the circulation of ambient cold water therethrough from cell to cell as would be the case with sponge rubber wherein the cells are interconnected. However, as already mentioned, conventional neoprene foam rubber unfortunately has several offsetting disadvantages. For one thing, the elasticity of the foamy interior mass is drastically reduced by the presence of a "skin" on both surfaces, which prevents full utilization of the desirable three-dimensional pliability of the foamy mass. Each cell at the surface is more rigidly connected with contiguous cells because of the "skin" structure than is the case with the cells in the interior foamy portion. In other words, conventional foam rubber garments do not possess the high degree of flexibility required in well designed underwater hoods. Hence, it is a practical impossibility to manufacture a foam-fitting underwater hood from conventional neoprene foam rubber without either fabricating it as too snug-fitting for wearer's comfort, or incorporating therein undesirable slits or other openings throughout the hood to enable it to be donned and doffed by the wearer with sufficient ease to be practicable. Otherwise, such hoods must be made oversized, and baggy as opposed to form-fitting, and of necessity incorporate the apparent disadvantages of loss of warmth, loss of streamlining, and so forth. Openings, other than those required for vision, breathing and overhead entrance and exit, introduce the added problem of providing zippers, buttons, buckles, hooks, snaps or the like, which closure means are generally susceptible to malfunction or failure at crucial moments when speed may be essential in donning or doffing the hood. Furthermore, most fasteners are cumbersome, difficultly operable, and cause inconvenience or often outright danger to the wearer of the hood. The protective covering for so vital an area as the head or neck should be form fitting and provide an inherent cushioning effect. This is exactly what the present invention proposes, along with a smooth and relatively tough exterior surface of a substantially water impervious texture.

In accordance with the invention, there is provided an ideal underwater hood which is skin-tight, form-fitting, and has just the proper amount of elasticity and resiliency to allow ease in donning and doffing as well as complete freedom of movement with comfort by the wearer. The invention provides an underwater hood with a smooth, sturdy external "skin" surface, reinforced at various locations of stress and wear, along with a complete absence of mechanical fasteners or closure means. Other features and desirable advantages will be readily apparent from the following description.

The underwater hood of the invention can be made from conventional neoprene foam rubber by eliminating the "skin" on the inner surface of said conventional neoprene, thereby allowing the soft, relatively porous, foamy neoprene to come into direct contact with the superficies of its wearer. The "skin" on the outer surface is retained throughout, thus utilizing all of the advantages of a smooth outer hood surface resistant to abrasions, cuts, tears and the like, while simultaneously providing the wearer with a comfortable garment having sufficient elasticity and resilience for donning and doffing with ease.

While thin rubber, already mentioned, is not readily bonded or closely held to the superficies of its wearer, and, conventional neoprene foam rubber is form-fitting only through the use of mechanical fasteners such as zippers or the like, an important feature of the present invention lies in the close adherence or bonding of the hood to its wearer. Such bonding in hoods other than those of the invention can be produced, if at all, only by exerting extremely uncomfortable pressure on the wearer's head and neck by deliberately providing a tight-fitting garment. Such a device would obviously impair the normal circulation of the blood and eventually result in serious harm to the wearer, not to mention the obvious discomfort in the interim.

Moreover, along with the feature of desirable structural elasticity provided by the foamy portion of the material of the invention, there is also an adhesion produced by the creation of a partial vacuum between the surface cells of the hood and the head and neck of its wearer. As the hood is donned by slipping over the wearer's head, the tiny pockets of air in the unicellular structure of the inner surface of the garment are distorted and compressed by the forces of elasticity as the form-fitting hood comes into intimate contact with the wearer's head and neck. The resilience of the garment tends to exclude the air from the surface cells, thereby creating a novel adhesive force or vacuum bonding between the hood and its wearer. Moreover, another characteristic of the foamy portion of the garment is its greater natural ability and tendency to conform to the natural irregularities of the head and neck structure and attendant superficies of the wearer, thus providing more area of contact and, hence, more vacuum bonding. None of these features, in particular, is found in underwater hoods now commercially available other than those fabricated in the herein-described manner.

In accordance with the invention, one of the smooth surfaces of a conventional neoprene foam rubber sheet is removed by longitudinal severance therefrom. A preferred embodiment of the invention is to fabricate two underwater hoods from the same sheet of conventional neoprene foam rubber. For example, if a garment of ⅛" thickness is desired, a sheet of ¼" thickness would be dissected lengthwise, thereby providing sufficient ⅛" material for the fabrication of two hoods. In this connection, for general use in "cold" water normally encountered, ⅛" neoprene has been found to provide sufficient protection from the ambient water, whereas, ¼" neoprene is a recommended thickness for swimming and diving in water of freezing temperatures. It has also been found comfortable, efficient and practical to wear more than one hood of ⅛" thickness each under severe conditions.

In order to function satisfactorily, the hood as described herein is made from unicellular neoprene foam rubber sheeting having "skin" on one side only. This is accomplished by cutting the specially prepared material in conformity with a pattern and then securely fastening the appropriate extremities together by sealing, vulcanizing, bonding, cementing, or the like. It may be found desirable to reinforce the seams as well as points or lines of stress by incorporating therewith additional strips of rubber or the like.

The invention may be more readily understood by referring to the drawing wherein Figure 1 is a perspective view of an underwater hood constructed in accordance with the present invention and shown in actual use by the wearer. Figure 2 is an enlarged fragmentary view typifying the specially fabricated unicellular neoprene foam rubber specified herein as the material of construction of the underwater hood.

In Figure 1, hood 11 comprises head covering portion 12, and neck covering portion 13, integral therewith. Forehead covering 14 and chin encasing portion 16 along with cheek enclosing portion 17 complete the facial protecting elements of said hood 11. Orifice 18 is provided for admission of breathing tube to the mouth of the wearer, and an opening of substantial size bounded by peripheral extremity 19 allows for vision of the wearer of said hood 11, usually through a standard underwater mask as is currently available for skin-diving and underwater swimming. Reinforcing means 21 and 22 are shown at points of stress or anticipated wear.

In Figure 2, the unicellular neoprene foam rubber material of construction is represented generally by 23, the "skin" like exterior 24 and the "skin" less interior 26 along with the many tiny and discrete unicells 27 forming the same.

From the foregoing it will be readily appreciated that the invention avoids that undue bulkiness and waste of material in hoods of other fabrication now generally available.

Furthermore, the hood of the present invention is not required to be absolutely water-tight or water-proof, although it may be made substantially so, if desired. The seepage of cold water into the unicellular structure is immaterial because it is prevented from circulating through the hood and small amounts which may be entrapped therein are immediately warmed to body temperature. The material of construction is exceptionally strong, yet pliant, and even where it may accidently become torn, the tears will not easily become enlarged. Moreover, the hood is useful in other than skin-diving or swimming activities in that it affords ample protection for its wearer against such phenomena as cold air temperatures or even shock waves. It is extremely light in weight, easy to use and keep clean, attractively streamlined in appearance, and readily packaged or stored without damage or wear.

It will be apparent that hoods of designs other than that specifically illustrated by the drawing, may be made within the spirit and scope of the present invention without departure from the disclosure hereof. For example, a hood having a frontal opening allowing for increased facial exposure may be adapted to certain situations wherein protection from outside forces is desired but cold temperatures are not particularly involved. In fact, a hood may be so designed that the chin, cheeks, lips and forehead of the wearer are not encased therein and the periphery of the frontal opening substantially surrounds the exposed face of the wearer, covering the ears and supporting the jaw. Even in a hood so designed, it would still be necessary to fabricate the protective hood of unicellular neoprene foam rubber having "skin" on one surface only in order to provide the desirable qualities enumerated herein while still allowing for ease in donning and doffing. No other material of construction now in use in this art is capable of the advantages offered by this specially prepared unicellular neoprene foam rubber.

While the salient features of this invention have been described in detail with respect to certain embodiments, it will of course be apparent that numerous modifications may be made within the spirit and scope of this invention, and it is not therefore desired to limit the invention to the exact details shown except insofar as they may be defined in the following claims.

What is claimed is:

1. A protective form-fitting hood suitable for underwater wear adapted to substantially enclose the head of its wearer and fabricated from unicellular neoprene foam rubber having a substantially water impervious structure of said neoprene rubber on the external surface only as distinguished from the skin-less internal surface of said unicellular foam rubber.

2. A protective form-fitting hood suitable for underwater wear comprising an upper head covering portion adapted to fit closely to the head of its wearer and provided with a frontal opening therein, and a neck covering portion integral with said upper head covering portion and adapted to embrace closely the neck of said wearer; said hood being fabricated from unicellular neoprene foam rubber having a substantially water impervious structure of said neoprene rubber on the external surface only as distinguished from the skin-less internal surface of said unicellular foam rubber.

3. A protective form-fitting hood suitable for underwater wear comprising an upper head covering portion adapted to fit closely to the head of its wearer and provided with a frontal opening therein, a lower jaw-covering portion adapted to fit closely under the jaw of said wearer, and a neck covering portion adapted to fit closely to the neck of said wearer; all of said portions being integral with each other and fabricated from unicellular neoprene foam rubber having a substantially water impervious structure of said neoprene rubber on the external surface only as distinguished from the skin-less internal surface of said unicellular foam rubber.

4. A protective form-fitting hood as in claim 2 wherein the periphery of the frontal opening therein is adapted to fit snugly around the face of said wearer the hood thereby encasing the ears, under portion of the jaw and a substantial portion of the forehead of said wearer.

5. A protective form-fitting hood as in claim 2 wherein the frontal opening therein comprises an eye-level cut out section allowing for vision of its wearer, and a centrally located breathing orifice adapted for positioning adjacent the mouth of said wearer, the periphery of said frontal opening adapted to fit snugly around the forehead and eye sockets of said wearer, the hood thereby encasing the ears, chin, and substantially the greater portion of the face of said wearer.

6. An integral unicellular foam rubber hood suitable for underwater wear which comprises head, face and neck covering portions adapted to fit closely to the head, face and neck respectively of its wearer; said hood being fabricated from unicellular neoprene foam rubber having a substantially water impervious structure of said neoprene rubber on the external surface only as distinguished from the skin-less internal surface of said unicellular foam rubber.

7. A protective form-fitting hood suitable for underwater wear comprising a crown covering portion with side, back and forehead covering portions extending therefrom, the lower extremities of said side covering portions extending forwardly and inwardly and being integrally joined to cover the chin and mouth of the wearer, said mouth covering portion being provided with a centrally located breathing orifice, and said hood being fabricated from unicellular neoprene foam rubber having a substantially water impervious structure of said neoprene rubber on the external surface only as distinguished from the skin-less internal surface of said unicellular foam rubber.

References Cited in the file of this patent

UNITED STATES PATENTS

| 204,204 | Cummerford | May 28, 1878 |
| 2,105,956 | Schnaittacher | Jan. 18, 1938 |
| 2,324,735 | Spanel | July 20, 1943 |
| 2,338,535 | Pfleumer | Jan. 4, 1944 |
| 2,700,977 | Neerup | Feb. 1, 1955 |

FOREIGN PATENTS

| 979,205 | France | Dec. 6, 1950 |